United States Patent [19]
Beer et al.

[11] Patent Number: 5,995,138
[45] Date of Patent: *Nov. 30, 1999

[54] TRANSPARENCY FILM DIGITIZER PERIPHERAL AND TRANSPARENCY FILM IMAGE MANAGEMENT AND COMMUNICATION SYSTEM FOR INTERNET

[75] Inventors: Richard D. Beer, Sunnyvale; Hassan Mostafavi, Los Altos; Dariush Rafinejad, Los Altos Hills, all of Calif.

[73] Assignee: Image Science Corporation, Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,344

[22] Filed: Jul. 25, 1996

[51] Int. Cl.⁶ .............................. H04N 5/253; H04N 9/47
[52] U.S. Cl. ............................................... 348/96; 396/16
[58] Field of Search ................................ 348/61, 96, 97, 348/110; 396/2, 14, 16, 429, 430; 353/103, 105, 106, 111; 128/903, 904; 358/506, 487, 403

[56] References Cited

U.S. PATENT DOCUMENTS

| | | | |
|---|---|---|---|
| 3,820,133 | 6/1974 | Adorney et al. | 396/2 |
| 4,089,017 | 5/1978 | Buldini | 396/2 |
| 4,091,397 | 5/1978 | Gulbrandsen | 354/81 |
| 4,291,955 | 9/1981 | Alvarez-Sabater | 353/111 |
| 4,688,099 | 8/1987 | Funston | 348/96 |
| 4,698,683 | 10/1987 | Schwartz et al. | 348/110 |
| 4,765,734 | 8/1988 | Truc et al. | 348/110 |
| 4,858,003 | 8/1989 | Wirt et al. | 348/110 |
| 5,253,069 | 10/1993 | Zeyer | 348/110 |
| 5,331,550 | 7/1994 | Stafford et al. | 364/413.02 |
| 5,402,170 | 3/1995 | Parulski et al. | 348/211 |
| 5,416,602 | 5/1995 | Inge et al. | 358/403 |
| 5,467,153 | 11/1995 | Fargeot | 348/110 |
| 5,543,833 | 8/1996 | Toyoda et al. | 348/110 |
| 5,555,042 | 9/1996 | Jones et al. | 348/110 |
| 5,606,392 | 2/1997 | Tintera et al. | 396/161 |
| 5,623,303 | 4/1997 | Inoue et al. | 348/96 |
| 5,734,915 | 3/1998 | Roewer | 395/773 |
| 5,740,428 | 4/1998 | Mortimore et al. | 395/615 |

*Primary Examiner*—Bryan Tung
*Assistant Examiner*—Nhon T. Diep
*Attorney, Agent, or Firm*—Thomas E. Schatzel; The Law Offices of Thomas E. Schatzel, A Prof. Corp.

[57] ABSTRACT

A computer-automation tool for dentists and insurance companies to communicate dental patient information is provided. Such system has a specialized PC-peripheral that produces digital images from transparency films and dental intra-oral intra-oral radiographs, e.g., x-ray films, for storage, retrieval, viewing, transmission, and processing on computer networks. For example, dental intra-oral radiograph images can be captured at a local dentist's office and transmitted over the internet to support quick insurance claim processing. The digitizer peripheral is automatic enough that no special skills beyond that of an office clerk are required. To digitize an x-ray film frame, the film is simply dropped into a slot on the digitizer peripheral. No menu items or key needs to be selected on the computer. The sensing of the film insertion, its positioning, and releasing it after digitization are all automatic. On-screen, the individual x-rays and intra-oral photographs are organized into patient panels and associated in a database together with patient background and administrative information.

9 Claims, 4 Drawing Sheets

Fig. 2

Fig. 3

TRANSPARENCY FILM DIGITIZER PERIPHERAL AND TRANSPARENCY FILM IMAGE MANAGEMENT AND COMMUNICATION SYSTEM FOR INTERNET

BACKGROUND OF THE INVENTION

1. Field of the Invention

The invention relates generally to intra-oral, x-ray and other film image digitizing methods and systems, and more specifically to computer systems and peripherals for inputting and databasing intra-oral, x-ray and other transparency film images for intranet/internet transfer between dentists, and for intranet/internet transfer between insurance companies and dental offices.

2. Description of the Prior Art

The taking and examining of dental x-rays is a common experience for most lay persons. The fact that most persons are also enrolled in some form of dental insurance plan is just as ubiquitous. It usually falls on the dentist to mount, collect and send such intra-oral radiographs to the insurance company in support of a dental benefits claim. Also, in the course of referring patients to specialists, general practitioners will often send x-ray films and other images to the specialist.

The digitization of dental x-ray films has been done using standard office flatbed scanners. However, such a process is very slow due to the limitations of the hardware mechanics and the functionality offered by conventional software. Thirty-five millimeter color film slide peripherals also exist in the prior art, but such peripherals are very slow, e.g., taking thirty seconds or more to digitize a single slide.

The image communication needs of dental offices are merely typical of larger applications that exist everywhere. Personal computers and the internet are now universally used to communicate various sorts of computer images and digitized photographs between client nodes. There is however a lack of computer peripherals and software able to efficiently and simply communicate and organize images of "hard copy" films.

SUMMARY OF THE PRESENT INVENTION

It is therefore an object of the present invention to provide an automated system for storing and retrieving dental x-ray and other transparency film type images.

It is another object of the present invention to provide a system for the digitization and electronic transmission by computer network of transparency film images.

Briefly, a digitizer system embodiment of the present invention comprises a digitizer peripheral that attaches with an interface board to a conventional IBM-compatible personal computer running the Microsoft WINDOWS disk operating system. The digitizer peripheral includes a CCD camera set to focus on a film held in a film receptacle-positioning-and-release mechanism. Two pivot fulcrums are provided on the solenoid mechanism such that a solenoid is able to push an arm that opens the solenoid mechanism from the top and to pull the arm to open the solenoid mechanism on the bottom. When the solenoid pushes the arm, the top of the solenoid mechanism opens to allow a film to be dropped in. The solenoid mechanism positions the film in the CCD camera focal plane when the solenoid relaxes. After imaging, the solenoid pulls the arm so that the bottom of the solenoid mechanism opens and allows the film to drop out. The digitized film images are automatically enhanced, cropped and presented in a window on the display monitor attached to the PC.

An advantage of the present invention is that a computer peripheral and software are provided that produces digital images from film for storage, retrieval, viewing, transmission, and processing on computer networks.

A further advantage of the present invention is that an automatic system is provided that produces digital images from dental intra-oral radiographs or other transparency film type images, for storage, retrieval, viewing, transmission, and processing on the internet and other computer networks.

Another advantage of the present invention is that a system is provided that allows dental intra-oral radiograph images to be captured at a local dentist's office and then transmitted over the internet to support quick insurance claim processing.

Another advantage of the present invention is that a system is provided as a peripheral to a personal computer that is so automatic that no special skills beyond that of an office clerk are required. To digitize a film frame, a film is simply dropped into an open slot on the digitizer peripheral. No menu items or keys need to be selected on the computer. The sensing of the insertion of the film, its positioning, and releasing it after the digitization of the image is complete are all automatic.

These and many other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENTS

Figure 1:
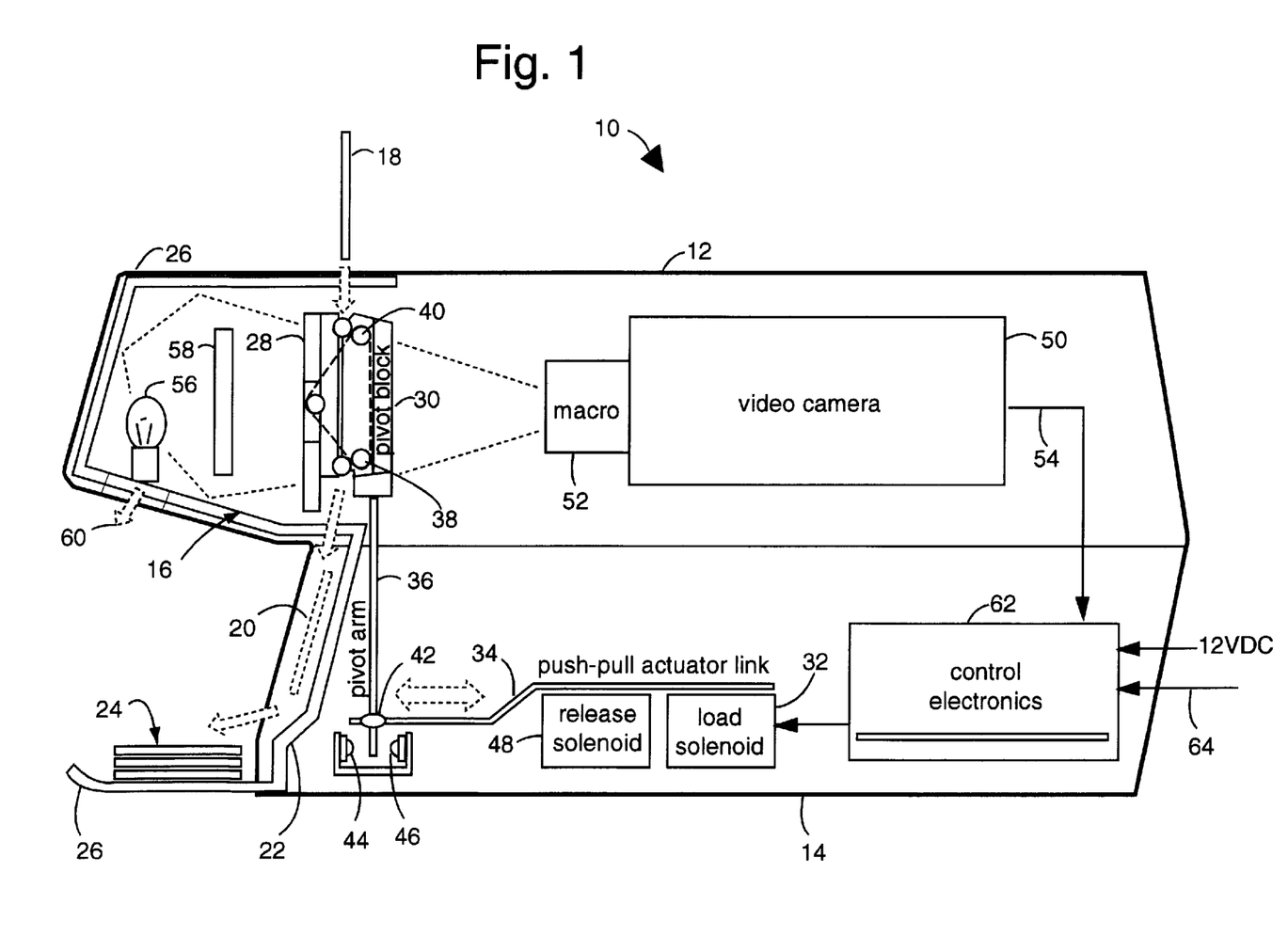
FIG. 1 is a side view of the internals of a digitizer peripheral embodiment of the present invention for use with a desktop or laptop personal computer.

FIG. 1 illustrates a digitizer peripheral embodiment of the present invention, referred to herein by the general reference numeral 10. The digitizer peripheral 10 is intended to locally connect to a personal computer (PC) capable of running the Microsoft WINDOWS disk operating system. In such case, a PC-compatible printed circuit board (PCB) interface is installed in the PC that does "frame-grabbing" from video provided by the digitizer peripheral 10, and that provides a few output port lines to control the operation of the digitizer peripherial I/O. A software program on disk which is distributed on a removable media is also included to run under the WINDOWS operating system.

The digitizer peripheral 10 includes a matching set of top and bottom housings 12 and 14. A film-handler frame 16 is constructed from sheet metal or plastic and has the rough shape of the letter "S" when viewed on-end from the side as in FIG. 1. A transverse slot is provided at the top so that a dental intra-oral radiograph 18 may be dropped in from above. Another slot allows a dental intra-oral radiograph 20 to drop out. A ramp 22 is bent into the film-handler frame 16 and helps to kick the bottom leading edges of the dropped intra-oral radiographs out so that they will overlay each other to form into a neat stack 24. A lip 26 is also bent into the film-handler frame 16 to keep the radiographs 24 from slipping away.

The dental intra-oral radiograph 18 is accepted between a diffuser block 28 and a pivot block 30 when a load solenoid 32 drives a push-pull actuator link 34 forward (to the left in FIG. 1). This causes a pivot arm 36 which is rigidly attached to the pivot block 30 to rock the pivot block 30 back on a lower fulcrum 38. With this, an upper fulcrum 40 separates. A rubber grommet 42 allows the push-pull actuator link 34 to capture and hold the end of the pivot arm 36 and allows a small amount of twisting between them. A pair of forward and back bumpers 44 and 46 limit the travel and absorb mechanical shock.

The dental intra-oral radiograph 18 is dropped by gravity from between the diffuser block 28 and the pivot block 30 when a release solenoid 48 pulls the push-pull actuator link 34 back (to the right in FIG. 1). This causes the pivot arm 36 to rock the pivot block 30 on the upper fulcrum 40. With this, the lower fulcrum 38 separates. When the bottom edges of the diffuser block 28 and the pivot block 30 separate sufficiently, the dental intra-oral radiograph 20 is allowed to drop out.

A video camera 50 with a macro lens 52 preferably provide a black-and-white video output 54 formatted according to the "NTSC" video standard adopted by the Federal Communications Commission (FCC) in the United States. Such output 54 is also preferred to be compatible with commercial video frame-grabber computer add-on cards marketed for personal computers. The macro lens 52 is focused on the plane that lies at the interface of the diffuser block 28 and the pivot block 30. The film-side of the surface of the pivot block 30 is ground slightly concave (along the vertical axis) and does not adversely affect the image obtained. Such concave relief is preferred because it helps prevent sticking of the dental intra-oral radiograph within when release is attempted.

The pivot block 30 preferably comprises optically clear plastic so that the video camera 50 can view the dental intra-oral radiographs without clouding or obstruction. The diffuser block 28 is a white translucent plastic material to make the backlighting of the dental intra-oral radiographs uniform.

A light bulb 56 is positioned inside a volume with a reflecting surface. A light stop 58 prevents direct light from causing hot-spots on the diffuser block 28. The light bulb 56 is preferably replaceable through a clip-in mechanism that can be withdrawn in a direction 60.

The solenoid mechanisms 32 and 48 have a rest position (as illustrated in FIG. 1) and are electrically controlled by a circuit 62. A control cable 64 provides signals to operate each of the solenoids 32 and 48, and the light bulb 56.

When the combination of the camera 50, the PC and software visually sense no dental intra-oral radiograph is present, the command signal from the PC to the controller 62 causes the solenoid mechanism 32 to push the arm 34 and rock the solenoid mechanism 30 and 36 on the lower fulcrum 38. This allows the dental intra-oral radiograph 18 to be dropped by gravity into the open "jaws." When the camera 50 has apparently sensed the dental intra-oral radiograph, the command signal from the PC to the controller 62 allows the load solenoid mechanism 32 to relax so that the whole of the pivot block 30 will press against the dental intra-oral radiograph.

A signal representing the visual image on the dental intra-oral radiograph is sent via cable 54 and is eventually displayed on a PC's monitor by a digitizer software program. Several such windows can be stored and retrieved by a conventional memory system in a PC. Preferably, the digitizer software program includes a database management program that allows each window to be related with some patient and to be transmitted out by the PC over a network, e.g., the internet or E-mail.

Alternatively, the digitizer software program directly controls the digitizer hardware mechanism for film feeding, fixating, and release in conjunction with image acquisition from the camera. Ease of use indicates that it is preferable to include automatic detection of film presence and image capturing. Automatic release of the film after image capture also helps make the system foolproof. Automatic cropping of the image to the film size is desirable in most situations, as well as automatically displaying the image in a new window.

In one embodiment of the present invention, image enhancement by frame summation and histogram adjustment was included. An image with an intermediate 10-bit gray-scale range is computed by the PC operating under the program from four raw image frames with 8-bit gray-scale range obtained from the camera 50. An optimized transformation derived from the intensity histogram from one of the captured films is used to map the intermediate 10-bit gray-scale range image back to a final image having an 8-bit gray-scale range. Such frame averaging provides for noise reduction and nonlinear intensity mapping without losing any of the input gray-scale values. A loss of intensity resolution could otherwise occur in the straight nonlinear mapping of an 8-bit input image to an output 8-bit image.

Figure 2:
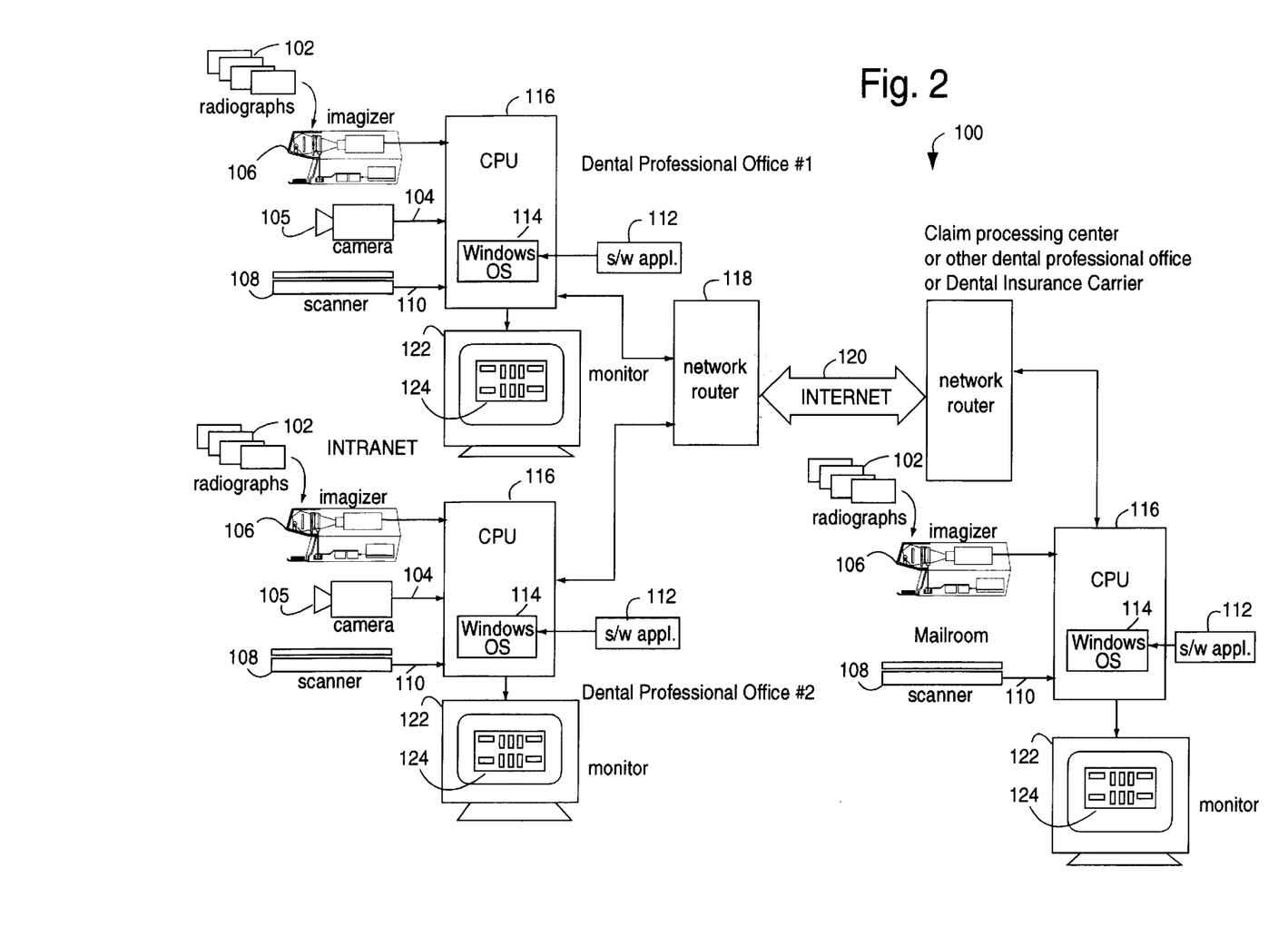
FIG. 2 is a block diagram of a dental health care system in which dental professionals and dental insurance carriers are integrated into an internet community that can efficiently communicate patient information and treatment plans.

FIG. 2 illustrates a typical dentist-office application 100. A complete dental health care management system is provided that is based on desktop or laptop personal computers and the internet. For example, a set of black-and-white intra-oral radiographs 102 are produced by x-ray exposure and chemical development in the traditional way. A set of full-color photographs of the visual appearance of the patient's gums and teeth may also be taken, e.g., as a set of "JPEG" files 104 with a portable digital camera 105. The black and white films 102 are digitized by a dental intra-oral radiograph imaging peripheral 106, similar to peripheral 10 in FIG. 1. Other images may alternatively be input by a scanner 108 that produces JPEG or other computer files 110. An application software program 112 provided such as a WINDOWS program 114 is loaded on a personal computer 116. The software program 112 allows either the selection of an enrolled patient from a list of patients, or the entry of new patient data. A router 118 makes both an intranet connection and an internet connection 120.

A high-resolution color monitor 122 is used to display the graphic information collected in a dental chart 124. The radiographs, color photos and other graphics are organized and manipulated on-screen with the aid of the application software program 112 and the WINDOWS disk operating system (DOS) program 114. The individual images can preferably be dragged, inverted, flipped, deleted, replaced, etc., by simple mouse control. A database management system included in the application software program 112 relates all images collected by patient, and allows background information to be included related to the chart 124.

For example, such graphics and patient health information can be shared between dental health professionals via an intranet/internet, or with a dental insurance carrier via the intranet/internet 120.

Preferably, the dentist or dental-assistant user is allowed to manipulate and arrange the images in the panel 124, e.g., one that simulates on-screen the cardboard or plastic frames commonly used for mounting multiple dental intra-oral radiographs. Once the various patients dental images are imported into the image management environment, they can be arranged in collections in a database for later retrieval, viewing and electronic transmission. For example, such images can be transmitted over the internet to an insurance company to support a dental benefits claim or to a colleague to garner a second opinion.

Figure 3:
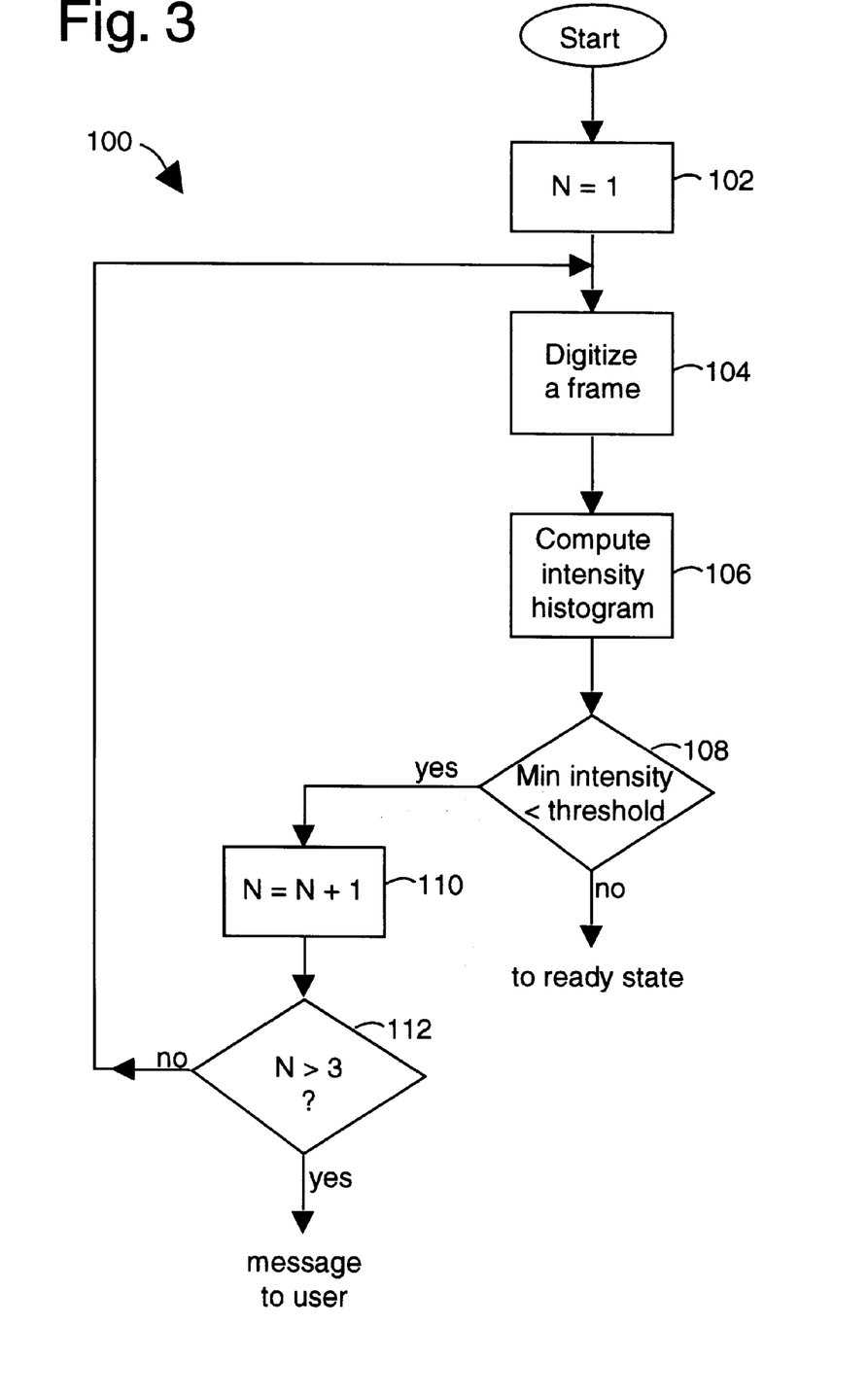
FIG. 3 is a flowchart that illustrates a process for the capturing of an image frame and the analyzing of a histogram of the image intensities within a central part of the frame.

The flowchart of FIG. 3 illustrates a process 200 for the capturing of an image frame and the analyzing of a histogram of the image intensities within a central part of the frame. A step 202 sets a loop counter to one. A step 204 inputs a film to the solenoid mechanism and digitizes a frame. A step 206 computes the intensity histogram of the frames captured thus far. A step 208 does an analysis to see if a minimum intensity value exceeds a predetermined threshold intensity. If not, program control passes on to assume a READY condition. If the minimum intensity value does not exceed the predetermined threshold intensity, it may be that either a film is present or that the camera is malfunctioning. A step 210 increments the loop counter N. A step 212 checks to see if more than three passes through the loop have occurred. If so, the monitor is used to display a message box that notifies the user that the solenoid mechanism may be jammed with a film or that the camera may have failed. If the loop has yet to complete more than three passes, the solenoid mechanism is opened to release the film, and the image capture and analysis cycle is repeated.

Given that the minimum intensity is satisfactory in step 208, the digitizer peripheral is put in the READY state to receive the film and to then automatically digitize them as they are dropped in by a user.

Figure 4:
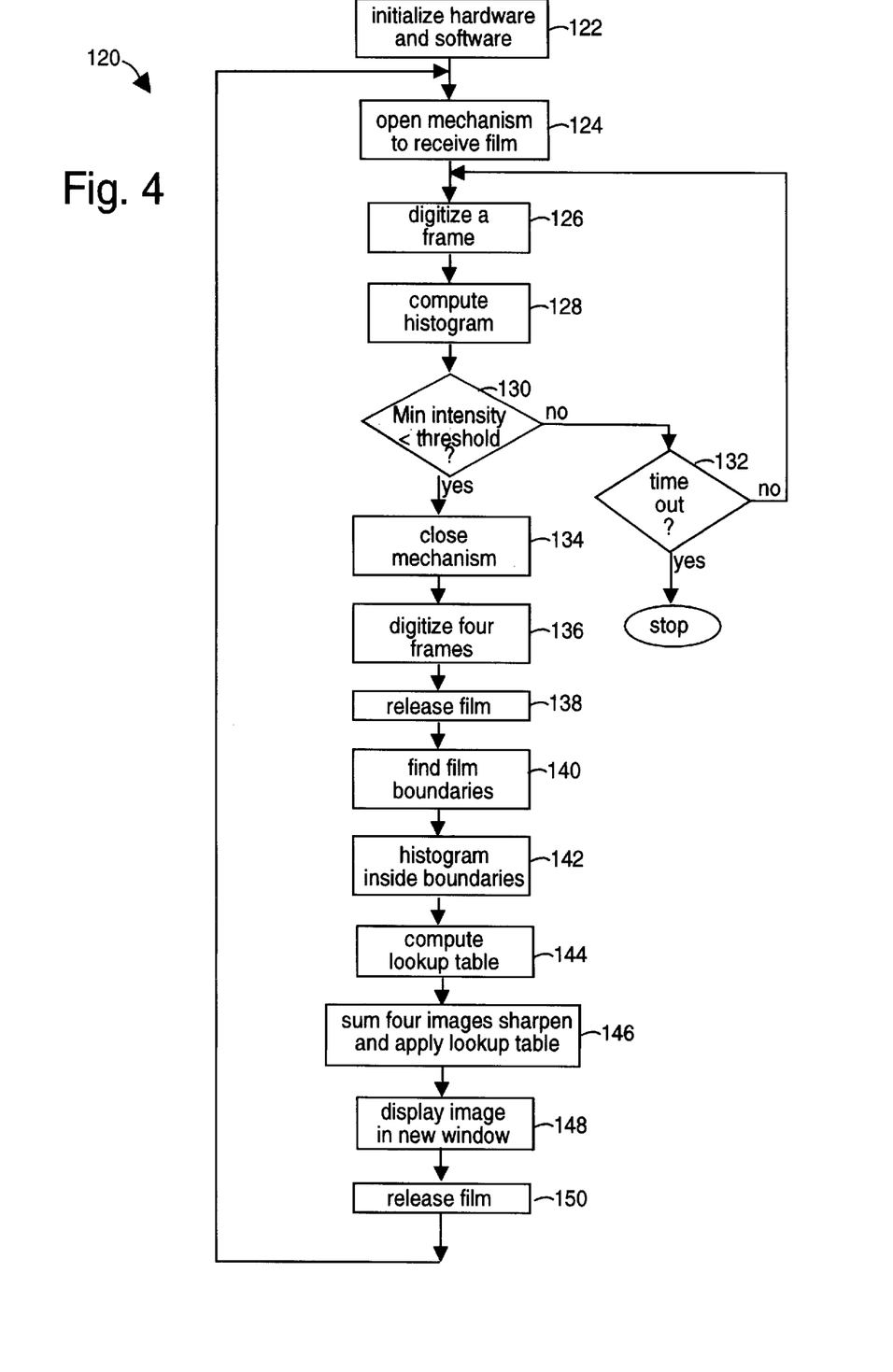
FIG. 4 is a flowchart that illustrates an automated image capture method of the present invention.

The flowchart of FIG. 4 illustrates an automated image capture method referred to herein by the general reference numeral 220. The method 220 includes a step 222 that initializes both the hardware and software of the system 10, e.g., method 100 may be included here. A step 224 commands the solenoid mechanism to open and prepare to receive the film from the top slot.

The sensing of the arrival of the film is implemented by continuously attempting to periodically digitize a frame in a step 226 and then determine in a pair of steps 228 and 230 the minimum intensity value of that being digitized. The absence of a film will digitize as an all-white scene with no dark minimums. When no part of the digitized intensity drops below a certain threshold intensity in a step 230, it can be concluded that the film is not yet present. Further cycles are repeated until a timer in a step 232 times-out. The solenoid mechanism is then closed and the system 10 enters a rest state. But, if a film is dropped into the top of the digitizer peripheral in the READY state before such time out occurs in the step 232, the digitized minimum intensity will drop below a threshold and the waiting is ended by proceeding to a step 234.

The solenoid mechanism is released in a step 234 to close on the film and press it into the focus plane. A step 236 takes four separate 8-bit resolution image frames and sends each to different parts of the reserved memory space in the PC. A step 238 causes the solenoid mechanism to pull the pivot arm to release the film out the bottom. A step 240 electronically finds the digitized image boundaries of the film just scanned. A step 242 computes an intensity histogram of one of the four images for an area inside the image boundaries, and analyzes the resulting histogram. A step 244 computes a lookup table. A step 246 sums the respective areas of the four images inside the boundaries found in the step 240, and applies the look-up table from the step 244 to the pixel intensities according to the results of the histogram analysis in step 242. A step 248 causes a new window to be displayed on the monitor with the resulting image in the new window. The digitizer peripheral then resumes the READY state and is set to accept a new film Computer-implemented methods may be used for embodying methods 200 and 220. A mix of pseudo-code and BASIC is used herein to suggest useful language syntax.

A find vertical boundaries function (Fvb) is to find the imaged horizontal locations of the vertical left and right boundaries of a film 18 in the digitized frame. The gradient in the horizontal direction is computed and the projected value of the gradient is accumulated over a number of rows that are specified by starting and ending rows, and a row increment value.

---

Input:
Pointer to the header for input image.
Width, w, and height, h, are extracted from this header.
Range check: w > 2, h > 2.
b = integer(0 to h−2)
t = integer(b+1 to h−1)
hp = signed integer (with absolute value 1 to w/2−1)
l = integer(hp to w−hp)
r = integer(l+1 to w−hp−1)
d = integer(1 to t−b)
Output:
x_max = integer (0 to r−1)
Computer-implemented method:
Initialize to zero the long integer array hst(x), x = 0 to r−1.
For y = b to t step d
   For x = 1 to r
      hst(x) = hst(x)+p(x−hp, y)−p(x + hp, y)
   Next x
Next y
max = hst(0)
x_max = o
For x = 1 to r−1
   if hst(x) > max, then max = hst(x)& x_max = x
Next x
Return x_max

---

A find horizontal boundary function (Fhb) finds the vertical location of the horizontal bottom and top boundaries of digitized frame of a film 18. The gradient in the vertical direction is computed and the projected value of the gradient is accumulated over the number of columns specified by starting and ending columns, and a column increment value.

---

Input:
Pointer to the header for input image.
Width, w, and height, h, are extracted from this header.
Range check: w > 2, h > 2.
l = integer (0 to w−2)
r = integer(l+1 to w−1)
hp = signed integer (with absolute value 1 to h/2−1)
b = integer(hp to h−hp)

```
t = integer(bt+1 to h-hp-1)
d = integer (1 to r-1)
Output:
y_max = integer (0 to b-t)
Initialize to zero the integer array hst(y), y = 0 to b-t.
For y = b to t
   For x = 1 to r step d
      hst(y) = hst(y)+p(x,y-hp)-p(x,y+hp)
   Next x
Next y
max = hst(0)
y_max = 0
For y = 1 to b-t
   If hst(y) > max,max = hst(y)& y_max = y
Next y
Return y_max
```

A compute histogram function (Hst) computes the occurrence frequency of pixel intensity values in an image subset. To increase the speed of execution while maintaining the statistical significance of the periodogram, the array is preferably sub-sampled in the horizontal and vertical directions. The output includes an array of histogram bins each corresponding to an intensity value and each containing the number of occurrences of that intensity value. The maximum and minimum intensity values encountered are output separately.

```
Input:
Pointer to the header for input image.
Width, w, and height, h, are extracted from this header.
Range check: w > 2, h > 2.
b = integer (0 to h-2)
t = integer (b+1 to h-1)
l = integer (0 to w-1)
r = integer (l+1 to w-1)
dx = integer (1 to r-1)
dy = integer (1 to b-t)
Output:
max, min
hst - long integer array of length 256
Initialize to zero hst(q),q = 0, . . ., 255
max = 0,min = 255
For y = b to t step dy
   For x = 1 to r step dx
      hst(p(x,y)) = hst(p(x,y))+1
   Next x
Next y
q = 255
While hst(q) = 0
q = q-1
WEnd
max = q
q = 0
While hst(q) = 0
q = q+1
WEnd
min = q
Return hst array, max, and min.
```

A sum-images-sharpen-and-normalize function (SumShrpNorm) operates on four input image frames that share a common rectangular area. An output image the size of the rectangular area is generated. In operation, the four images within the common rectangular area are summed and then sharpened with an adjustable spatial filter. The intensities of the summed image with a 0–1023 range are mapped into a 0–255 range using an optimum lookup table. The input includes a lookup table computed from the results of analyzing the histogram of one of the input 8-bit images.

```
Input:
Pointers to header data for four input images in that order.
Width, w, and height, h, extracted from these must be checked
for being the same for all images.
Range check: w > 2, h > 2.
Pointer to header data for the output image.
Integer array lut(n), n = 0, . . ., 1023, with entries guaranteed
to be in the 0 to 255 range.
bottom = integer
left = integer
a = Real
Output:
Output pixels written after the output image header.
Define (pn(x,y), x = 0, . . ., w-1 and y = 0, . . ., h-1) to be the
pixels of image n for n = 1,2,3,4. Similarly let po(x,y) be
the corresponding output image pixel.
Detine buf1(x) and buf2(x), x = 0, . . ., w-1 as two real
temporary buffers.
Let:
b = (4+3*a)/a
c = a/4
For y = 0 to h-1
   For x = 0 to w-1
      buf1(x) = p1(x+left, y+bottom) + p2(x+left,
y+bottom) + p3(x+left, y+bottom) + p4(x+left, y+tbottom)
   Next x
   For x = 2 to w-3
      buf2(x) = c * (-0.5*buf1(x-2)-buf1(x-1)+b *
buf1(x)- buf1(x+1)-0.5*buf1(x+2))
(For the four end points buf2(x), x = 0,1,w-2,w-1, setbuf2(x) =
buf1(x) and use the same equation as above to set the
output pixel)
      if Round(buf2(x)) is between 0 and 1023, then
   po(x,y) = lut(Round(buf2(x)))
      else if it is less than 0 then
         po(x,y) = lut(0)
      else
         po(x,y) = lut(1023)
      end if
   Next x
Next y
```

The histogram array and the minimum/maximum values are computed from one of the four digitized 8-bit images. The area of interest to be processed is inside the rectangle defined by the vertical and horizontal boundary finders. The number of pixels accumulated in the histogram is found, as in, num_pix=hist(min)

For xx1=min+1 To max num_$_{pix-num}$_pix+hist(xx1)

Next xx1.

Then, xx2, the high percentile pixel intensity, e.g., the pixel intensity above which high_pcnt of the pixel values are, is computed, accum=hist(max)+hist(max-1)

xx2=max

While accum<3*high_pcnt*num_pix xx2=xx2-1 accum=accum+hist(xx2)+hist(xx2-1)+hist(xx2+1)

Wend.

Similarly, the low percentile pixel intensity, xx1, is computed, accum=hist(min)+hist(min+1)

xx1=min

While accum<3*low_pcnt*num_pix xx1=xx1+1 accum=accum+hist(xx1)+hist(xx1−1)+hist(xx1+1)

Wend.

The gain and offset for mapping the input range (xx1,xx2) to the output grange (yy1,yy2) is computed, alpha=(yy2−yy1)/(xx2−xx1)

beta=((yy1+yy2)−alpha*(xx1+xx2))/2

From these, the lookup table parameters are computed, sc1_b=−4*beta/alpha

If sc1_b<0 Then sc1_b=0

End If sc1_c=(1023−4*beta)/alpha

If sc1_c>1023 Then sc1_c=1023

End If gamma=255/(sc1_c−sc1_b)^0.7

The lookup table computation is,

```
For i = 0 To sc1_b
    lut(i) = 0
Next i
For i = sc1_b+1 To sc1_c
    lut(i) = gamma*(i-sc1_b)^0.7
Next i
For i = sc1_c+1 To 1023
    lut(i) = 255
Next i
```

The hardware and software embodiments of the present invention produce digital images from dental intra-oral radiographs (dental x-ray films) for storage, retrieval, viewing, transmission, and processing on computer networks. A principle application is in the transmission of dental radiograph images in conjunction with insurance claim processing. The peripheral 10 is preferably the size of a toaster, automatic and fast, and not requiring any special skill beyond that of an office clerk. The actions required of an operator to digitize a frame is limited to dropping the film by gravity feed in a slot on the peripheral 10 without having to press any keys, or entering any menu items on the computer. The sensing of the film insertion, its positioning, and releasing it after digitization are preferably all automatic. When used with a typical PC, the digitization and data transfer to the PC memory takes less than the time it takes the operator to pickup the next film and drop it in the digitizing peripheral 10 slot.

In a typical dentist office, a set of radiographs are produced and digitized in conjunction with examination of a patient. Before digitizing each set of radiographs the software allows selecting from a list of patients, or entry of a new patient data. In addition the dentist or dental assistant can perform image manipulation and arranging of the images in a collage, simulating in software the cardboard or plastic frames used for mounting multiple dental radiographs. Once imported into the image management software environment, the digitizing peripheral 10 images—like images from any other sources—can be added to an image collection in a database of images for later retrieval and viewing and/or electronic transmission.

The peripheral 10 software 112 has several functions:
  (a) Control of the peripheral 10 hardware mechanism for film feeding, fixating, and release, in conjunction with image acquisition from the digitizing peripheral 10 image sensor;
  (b) Automatic detection of film presence and image capture from the peripheral 10 image sensor;
  (c) Automatic release of the film after image capture;
  (d) Automatic cropping of the image to the film size;
  (e) Image enhancement by frame summation, and histogram adjustment. This function creates an intermediate 10-bit (0 to 1023 intensity range) from four 8-bit (0 to 255 intensity range) images, and then maps the intensities back to the 8-bit (0 to 255) range using an optimized transformation. This achieves two goals: 1) frame averaging for noise reduction and 2) nonlinear intensity mapping without losing any of the input gray scale values, which otherwise occurs in any nonlinear mapping of an 8-bit image to an output 8-bit image; and
  (f) Automatic display of the image in a new window of the digitizing peripheral 10 image management software.

Using image sensing and digital processing, the peripheral 10 automates the film digitization operation. The software running on the PC CPU senses the film status and commands the system accordingly. The system operation can be defined by the following steps:

READY - the peripheral 10 enters this state 1) after power-up and upon issuing the Acquire from the peripheral 10 command by the software, and 2) after the film is released and drops from the solenoid mechanism (RELEASE step described below). In this state the film receptacle is opened for receiving the film through the top slot in the digitizing peripheral 10 shell. The software continuously checks for changes indicating the film's arrival in the image sensor field of view.
CAPTURE - This process occurs once 1) the arrival of the film in the field-of-view is automatically detected. The solenoid mechanism fixes the film in the focus position, multiple frames are digitized into the PC solid state random access memory, followed by the necessary analysis, enhancement, and display in a new window.
RELEASE - This step follows 1) the capture step described above. The solenoid mechanism opens and the film drops from a slot under the digitizing peripheral 10 (gravity release) in a small tray.
RELEASE/STOP - The solenoid mechanism is closed and automatic film arrival detection is stopped. This event occurs when 1) the manual Stop/Release command is issued, or 2) after a preset length of time, determined by the software setup parameters, is elapsed.

The software, in addition to controlling the above functions, displays the digitized images in cascaded windows or automatic placement in preselected "soft mounts" for visual verification. An "Acquire From the peripheral 10" command issues a close command to the solenoid mechanism, initializing the image digitizer hardware, and allocating the memory. It then verifies that no film has remained in the solenoid mechanism from before. The flowchart of FIG. 1 describes this function. It does this by capturing a frame and analyzing the histogram of the image intensities within a central portion of the frame. If the minimum value is below certain threshold intensity it is concluded that either a film is present or that the image sensor is malfunctioning. As a result the solenoid mechanism is opened for releasing the film, and the image capture and analysis cycle is repeated. If after three tries, the minimum intensity is still below threshold, a message box notifies the user of the possibility of a film being stuck or that the image sensor may be malfunctioning.

If the minimum intensity is below the threshold, the digitizing peripheral 10 is put in the ready state to receive the films and automatically digitize them. The flowchart of FIG. 2 describes the functional flow of automated image capture by the peripheral 10 in this state. This is done by first opening the solenoid mechanism to receive the film from the top slot. The sensing of the film arrival is achieved by continuously digitizing a frame in response to a software timer prompts, computing the histogram, and finding the minimum intensity value. If the intensity is above a certain threshold, it is concluded that the film is not present, and the cycle is repeated until a second timer prompt is issued indicating a time-out which in turn results in the digitizing peripheral 10 mechanism closing and going to the rest state.

In the ready state, once a film is dropped in the digitizing peripheral 10 slot, the minimum intensity goes below the threshold, and the above cycle is interrupted. This triggers the following sequence of actions: 1) the solenoid mechanism is closed resulting in the film being fixed in the focus plane, 2) four 8-bit image frames are captured in separate areas of the PC memory, 3) open the solenoid mechanism to release the film, 4) find the boundaries of the film in one of the digitized frames, 5) compute the intensity histogram of one of the four images for an area inside the image boundaries, and analyze the histogram, 6) for a rectangular area limited by the film boundaries found in Step 4, sum the four images and apply the look-up table to the pixel intensities according to the results of the histogram analysis in Step 5, and 7) initiate a new window in the digitizing peripheral 10 software and display the resulting image in the new window.

The applications software 112 preferably provides a comprehensive framework for dental image acquisition, display and management. It ideally can acquire images from a variety of sources, manage the images obtained in a central database shared by many workstations, and do the required level of image enhancement for assist in diagnosis and treatment. A real-time full color high-resolution capture from intra-oral cameras and scanners is also used to accentuate and support dental diagnoses and treatment strategies. The database management portion is configured to present a patient's data in a series of "mounts" on screen. Individual display tools are provided for magnification, rotation, contrast enhancement, and dimensional measurement.

A network interface part of the applications software 112 preferably provides e-mail support for dental patient health data via internet transfer protocol (TCP/IP). An intra-oral camera video capture part of the applications software 112 preferably provides a live video window on the monitor. A freeze-function allows a video-frame to be "grabbed" from the live presentation window. Such frame-grabbed video image is converted to a file and associated by the database management system with a particular patient. An "auto-place" function allows a panel or mount to be automatically filled by each such image obtained in a series.

Although the present invention has been described in terms of the presently preferred embodiments, it is to be understood that the disclosure is not to be interpreted as limiting. For example, the present invention is not limited to applications only in dentistry, nor even limited to medicine. The film 18 entered could be of anything, e.g., real estate or family photos. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A dental-office computer-automation health care system, comprising:

a personal computer system with software in the form of a disk operating system (DOS) and a hardware interface for a dental radiograph digitizer and a computer network;

an applications program for loading and execution under said DOS and providing for the conversion of dental radiographs for particular patients to graphic image computer files, and including a database management system to manipulate and organize dental health information;

a dental radiograph digitizer connected as a peripheral to the personal computer system;

a film acceptance-positioning-and-releasing mechanism having upper and lower fulcrums;

a push-pull solenoid connected to pivot the film acceptance-positioning-and-releasing mechanism on said lower fulcrum to allow a film to be dropped in from above and to pivot on said upper fulcrum to drop out said film by gravity; and an electronic-imaging camera focused to image and digitize said film held in the film acceptance-positioning-and-releasing mechanism.

2. The system of claim 1, wherein the digitizer peripheral further comprises:

a light source positioned on a side of the film acceptance-positioning-and-releasing mechanism opposite to the camera;

a diffuser positioned between the light source and the film acceptance-positioning-and-releasing mechanism; and a reflector positioned on a side of the light source opposite to the diffuser.

3. The peripheral of claim 2, further comprising:

an interface providing for an electrical connection between a computer and the controller, and further providing for a digitized image transfer from the camera and said computer.

4. A digitizer system, comprising:

a film acceptance-positioning-and-releasing mechanism having a pair of first and second fulcrums and providing for the mechanical acceptance of photographic images previously recorded externally on transparency slide film, the holding of said transparency slide film for electronic imaging, and the mechanical release of said transparency slide film after imaging;

a push-pull solenoid connected to sequence the film acceptance-positioning-and-releasing mechanism by first pivoting said first fulcrum to allow said transparency slide film to be dropped in from above and by subsequently pivoting on said second fulcrum to drop out said transparency slide film by gravity;

an electronic-imaging camera with a solid state image sensor optically focused to image and digitize said transparency slide film when being held in the film acceptance-positioning-and-releasing mechanism;

a light source positioned to backlight said transparency slide film when being held by the film acceptance-positioning-and-releasing mechanism;

a diffuser positioned between the light source and the film acceptance-positioning-and-releasing mechanism and providing for a softer more diffused light behind said transparency slide film while being imaged;

a reflector positioned relative to the light source and for increasing backlighting directed to the diffuser;

a controller connected to operate the push-pull solenoid such that said transparency slide film is mechanically shuttled in and then out and connected to operate the camera at particular times to obtain an electronic image from a photographic image recorded on said transparency slide film, and further providing for automatic detection, coordinated acceptance, positioning, image digitizing and releasing of said transparency slide film;

a computer system with a disk operating system and a display monitor; and an interface board and cable for connection to the controller and providing for digitized image transfer between the camera and the computer system.

5. The system of claim 4, further comprising:

a computer software program for loading and execution on the computer system and for interfacing with said disk operating system with digitized images such that said transparency slide film is automatically detected, accepted, positioned, imaged and released via the controller.

6. The system of claim 5, wherein:

the computer program further provides for image storage, retrieval, and database management of a plurality of digitized images and the selective electronic transmission of items via computer networks.

7. The system of claim 5, wherein:

the computer program further includes means for the automatic image storage, retrieval, database management of a plurality of digitized images, and provides for a selective electronic transmission of electronic image files between clients on a computer network.

8. The system of claim 4, further comprising:

a computer program for loading and execution on the computer system and for interfacing with said disk operating system such that the presence of a film in the film acceptance-positioning-and-releasing mechanism is detected by attempting to digitize an image with the camera and then comparing various parts of the image to a predetermined threshold value.

9. The system of claim 4, wherein:

the push-pull solenoid comprises a set of two pull-in only solenoids connected head-to-toe such that when one pull-in only solenoid operates the combination produces a pull on an arm, and when the other pull-in only solenoid operates the combination produces a push on said arm.

* * * * *